Oct. 8, 1968        J. F. DIRAC        3,405,394
CONTROLLED REGISTER ACCESSING
Filed Dec. 22, 1965        7 Sheets-Sheet 1
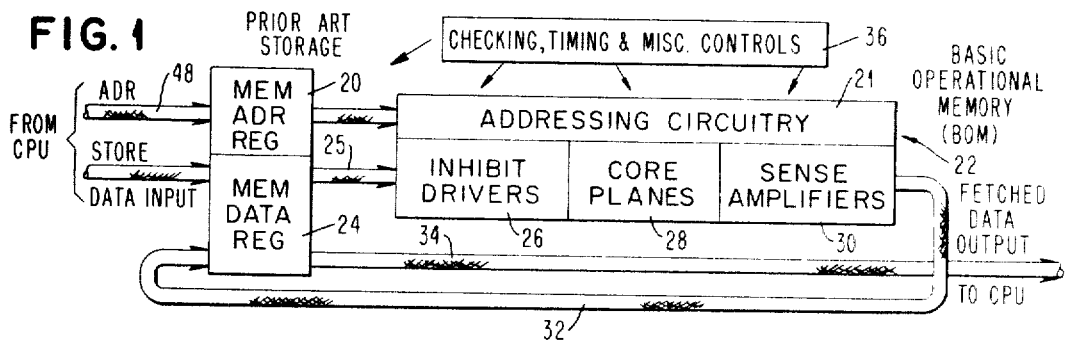
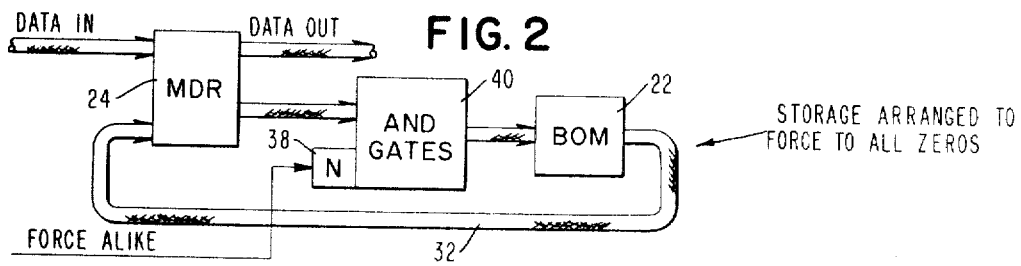
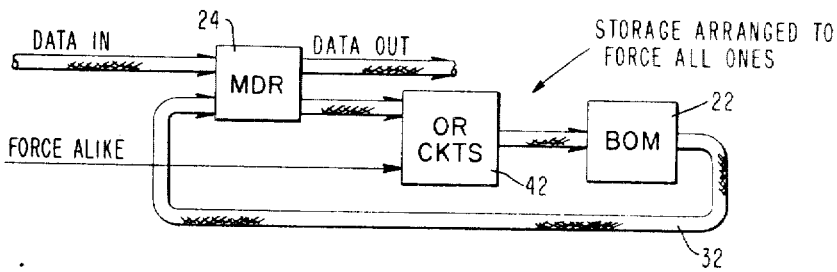
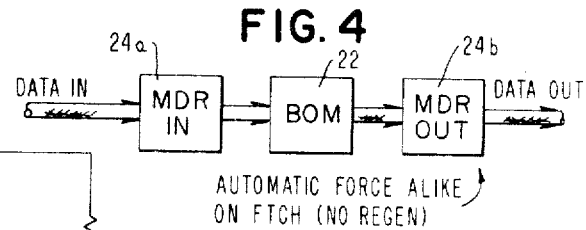
INVENTOR
JULES F. DIRAC
BY *Melvin P. Williams*
ATTORNEY Oct. 8, 1968    J. F. DIRAC    3,405,394
CONTROLLED REGISTER ACCESSING
Filed Dec. 22, 1965    7 Sheets-Sheet 2

Oct. 8, 1968    J. F. DIRAC    3,405,394
CONTROLLED REGISTER ACCESSING
Filed Dec. 22, 1965    7 Sheets-Sheet 3
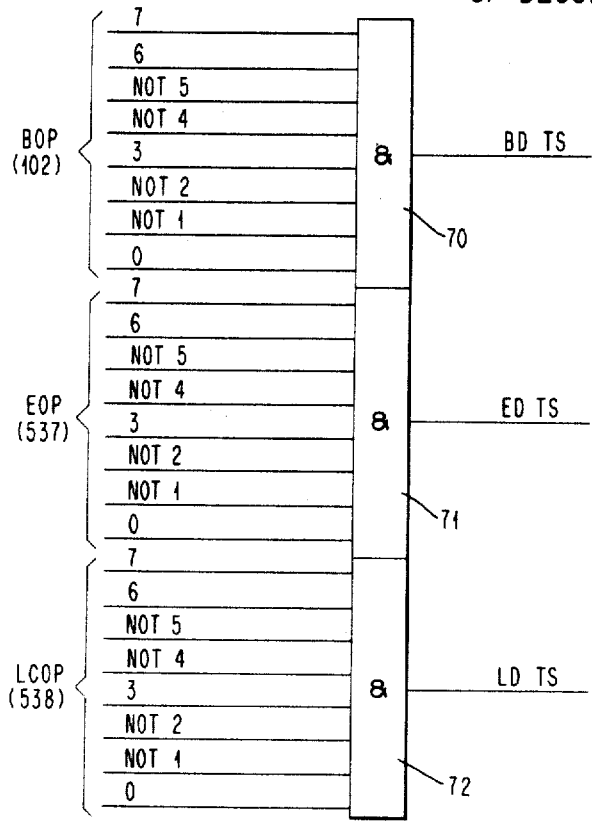
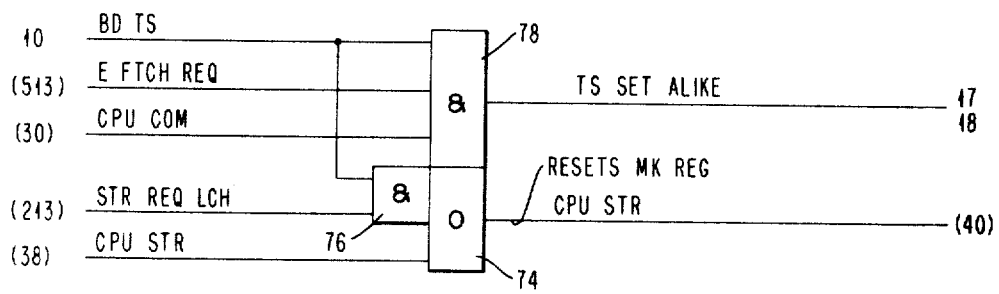

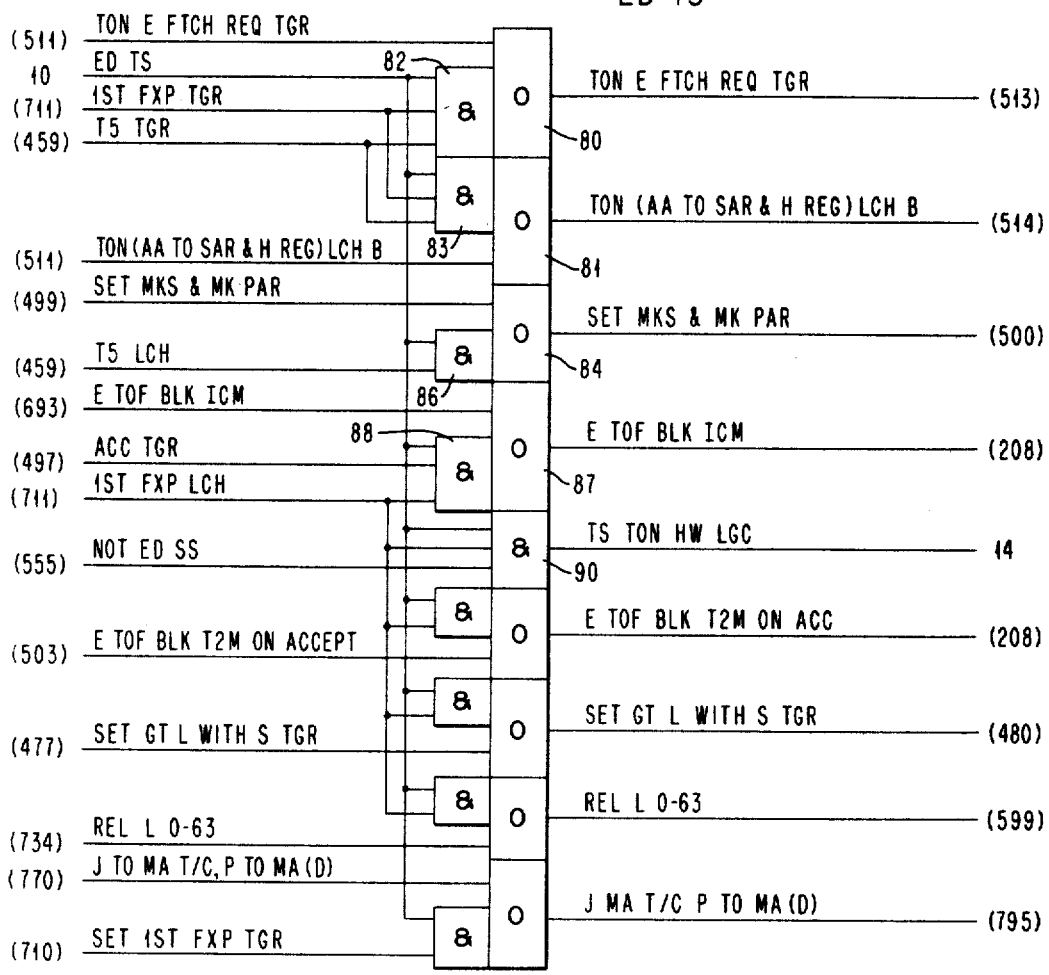
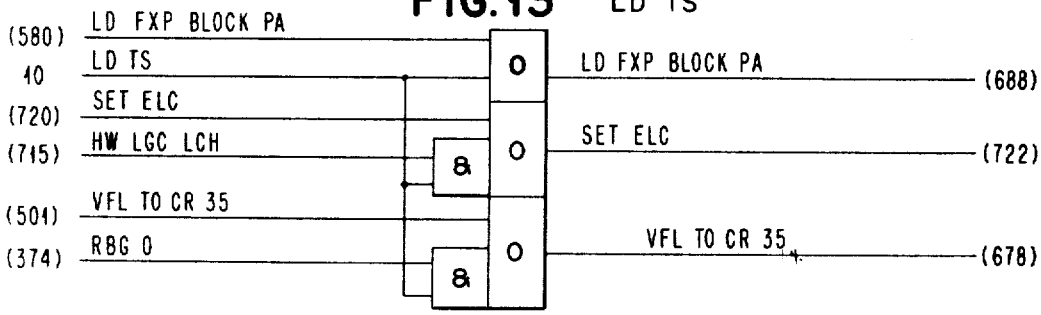

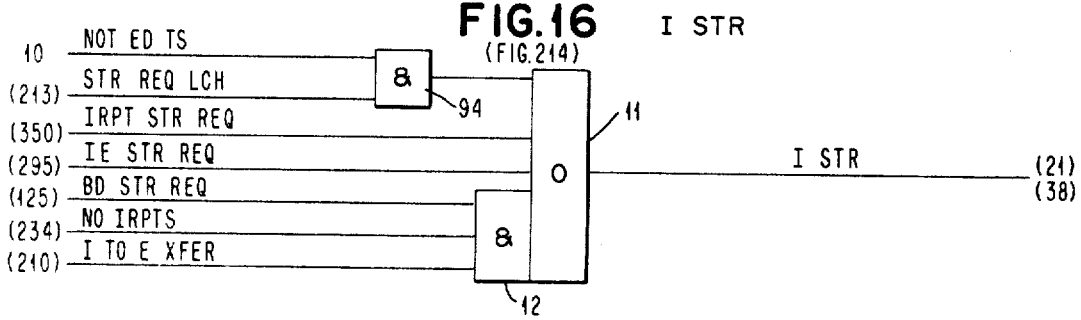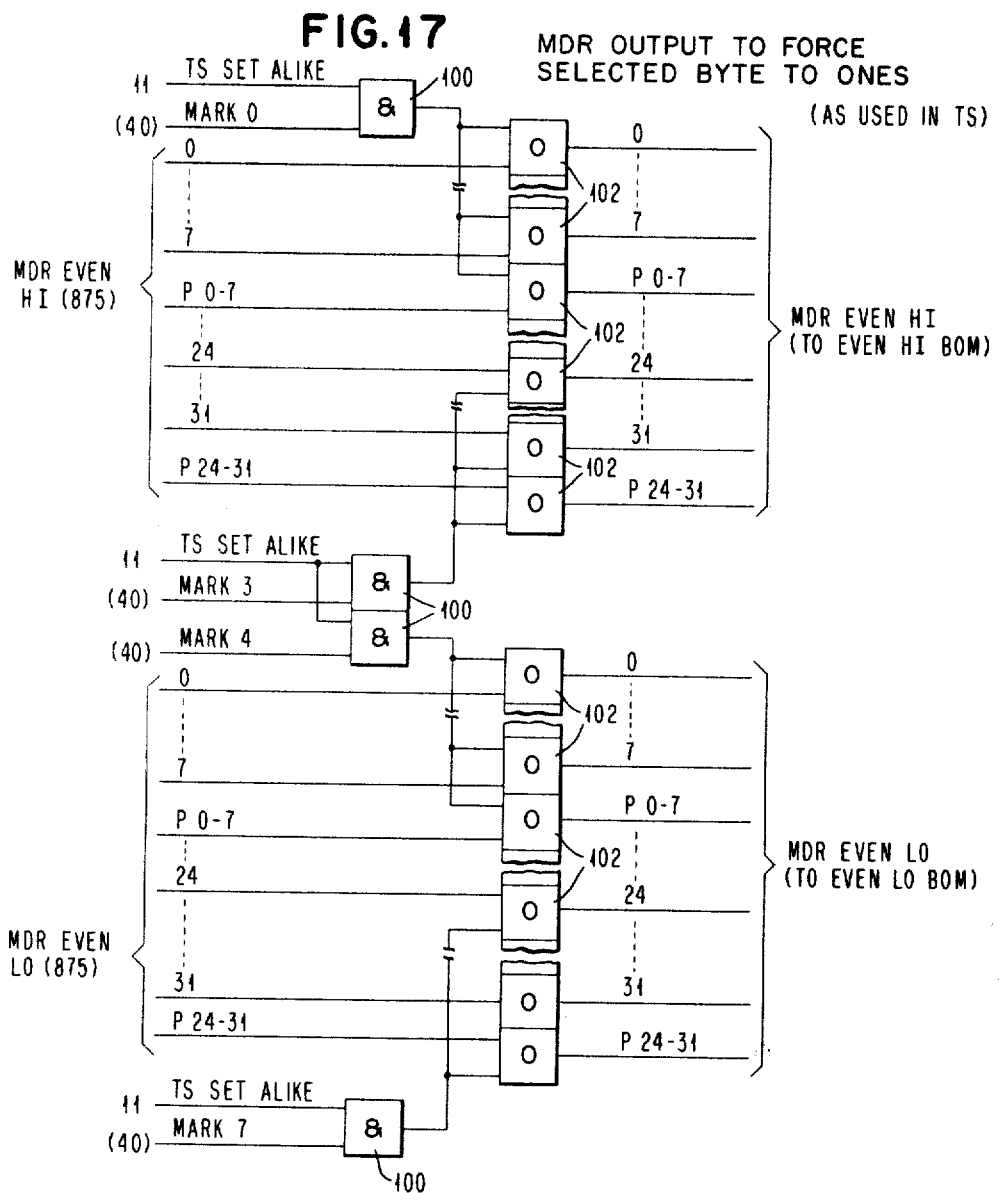

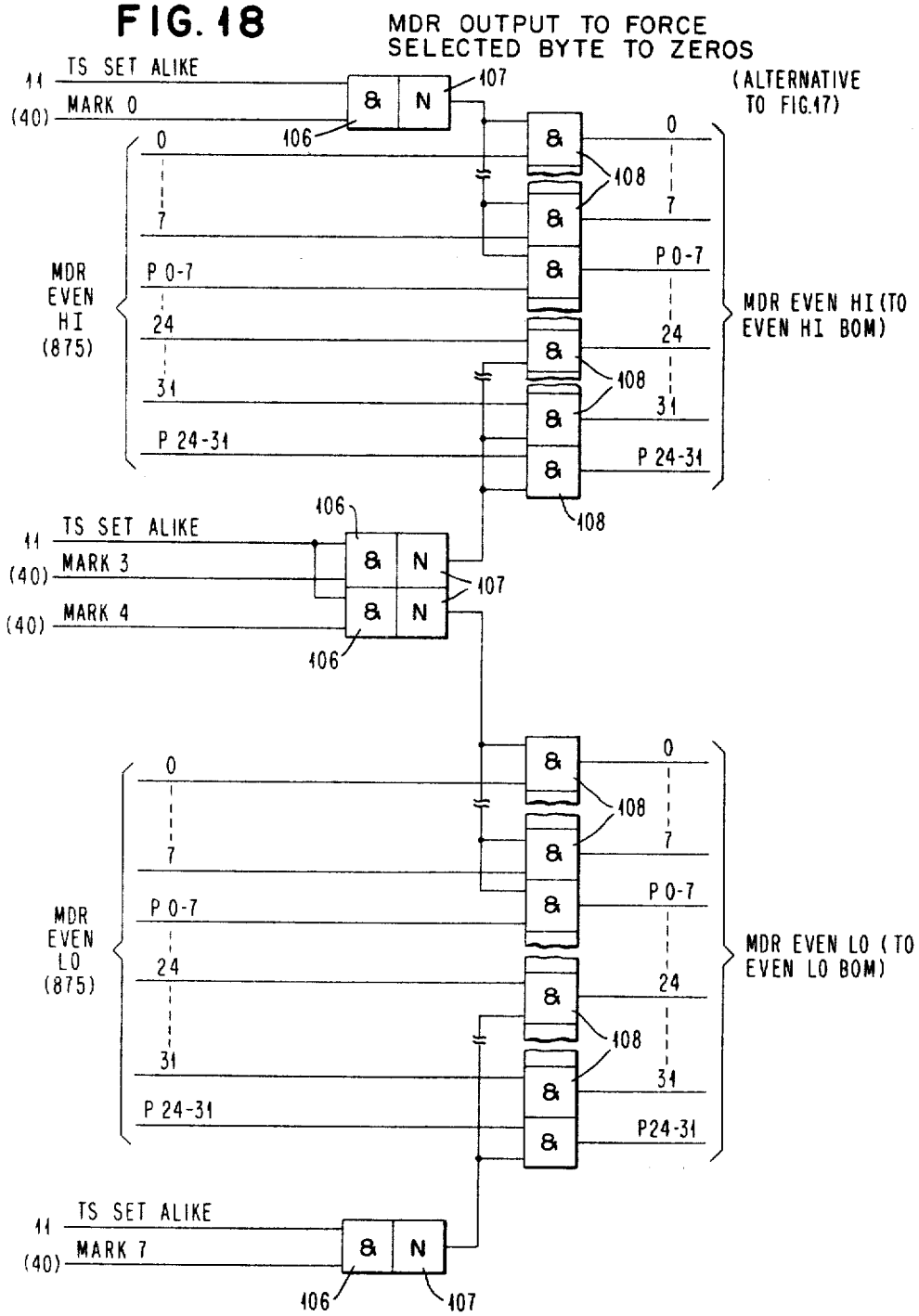

United States Patent Office 3,405,394
Patented Oct. 8, 1968

3,405,394
CONTROLLED REGISTER ACCESSING
Jules F. Dirac, Poughkeepsie, N.Y., assignor to International Business Machines Corporation, Armonk, N.Y., a corporation of New York
Filed Dec. 22, 1965, Ser. No. 515,657
13 Claims. (Cl. 340—172.5)

ABSTRACT OF THE DISCLOSURE

In the environment of a data processing system, an apparatus for controlling access to a storage unit is disclosed. The accessibility condition of the storage unit is identified by the bit configuration within a particular location in or associated with the storage unit. The bit configuration is directly forced to a preestablished code whenever the location is accessed. Further accessing of that location causes the preestablished bit configuration to be read-out and tested thereby signifying that the storage unit is in a nonaccessible condition. That further accessing directly causes a preestablished bit configuration to be forced into the location independently of what accessibility condition was detected by the test on the read-out bit configuration. When it is desired to remove the nonaccessibility condition, the bit configuration in the location is reset.

---

This invention relates to data processing, and more particularly to the controlled accessing of a register, or storage location.

A recent development in the data processing art is the more frequent use of the functional sharing of computer hardware; this may take a variety of forms, including several central processing units (CPU's) sharing a single storage apparatus, or several programs within a single system sharing the use of the CPU hardware, etc. A necessary corollary to the sharing of hardware is the provision of interlocking controls so as to properly govern such sharing. For instance, if one of two CPU's is ordered to update an entry in a table, the other CPU should be prohibited from making reference to that item during the necessary READ and WRITE cycles of a common storage apparatus within which the item is registered. Alternatively, if an entire unit (such as a storage apparatus) is to be exclusively allocated to one of a pair of CPU's for a period of time, this exclusive allocation must be identified in a functionally workable manner. This identification might be controlled, for instance, by a particular word in a register or in an identifiable location of storage, the word having a different characteristic in dependence upon the availability of the controlled unit to a particular CPU.

The foregoing are illustrations of the utility of a controlled access register, or storage location, in the data processing art. There are other applications wherein such controlled accessing is of value.

Accordingly, the primary object of the present invention is to provide controlled accessing to a register or storage location.

Another object of the invention is to provide foolproof, simple control over the accessing of the contents of a register or storage location.

A further object of the invention is to provide versatile functional capability with respect to the status or content of a register or a storage location.

This invention is predicated on the concept that the data content of a storage location or register may be so controlled as to give an indication of the availability thereof, or of some other functional characteristic extant within a data processing system, as a direct consequence of the accessing of the register or location.

In accordance with the present invention, the content of a register or storage location is forced into a known state directly as a result of reading the contents thereof. The content of the register or location may have multiple meanings, including a variable data quality, in dependence upon the particular combination, or configuration, of the data bit manifestations stored therein, as well as control qualities, which depend upon a fixed pattern, determinable variable patterns, or the status of individual elements or parts thereof. In one embodiment of the invention, the actual data content of a storage register can be forced to all ONE's or all ZERO's whenever the location is accessed, thus maintaining the location in a recognizable "busy," "empty," or "nonaccessible" condition. In another embodiment of the invention, any particular configuration of data bits may be recognized as indicating the empty or nonaccessible condition; in a further embodiment of the invention, any of the aforementioned conditions may be utilized merely as a further control upon the system; in a still further embodiment of the invention, a particular one of the bit manifestation positions of a register or storage location may be tested for the status indicated thereby, for use in a variety of functional controls.

The invention permits very simple, yet absolutely foolproof control over various functions in a data processing system, such as, for instance, the accessing of a storage location common to one or more functions in one or more different central processing units. The status or condition which is obtained by accessing the storage location is automatically created, thus minimizing further controls and tests. The control provided by the invention may be utilized directly to prevent further accessing of the same register or storage location, or may be utilized through other mechanisms to control different functions of the system, thus lending flexibility to any utilization thereof.

The foregoing and other objects, features and advantages of the present invention will become more apparent in the light of the following detailed description thereof, as set forth in the accompanying drawings.

In the drawings:

FIG. 1 is a simplified schematic block diagram of an exemplary prior art storage device including address and data registers, various controls, and the basic operational memory (BOM) which includes core planes, circuits for addressing respective portions of the planes, drivers and sense amplifiers;

FIG. 2 is a further simplified schematic block diagram of a storage apparatus of the type illustrated in FIG. 1 which has been modified so as to permit forcing an entire group of data bits to all ZERO's in response to a "FORCE ALIKE" signal;

FIG. 3 is a further simplified schematic block diagram of a storage apparatus of the type shown in FIG. 1 which been modified so as to permit forcing an entire group of data bits to all ONE's in response to a "FORCE ALIKE" signal;

FIG. 4 is a further simplified schematic block diagram of a storage apparatus of the type shown in FIG. 1 which has been modified so as to permit forcing an entire group of data bits to all ZERO's automatically, in response to any fetch request, due to the lack of regeneration circuitry;

FIG. 5 is a schematic diagram of an inhibit driver circuit modified so as to block the inhibiting current utilized to set individual data items into a magnetic core storage, whereby all of the cores normally driven in response to a particular grouping of inhibit drivers will be set to ONE's;

Figure 14:
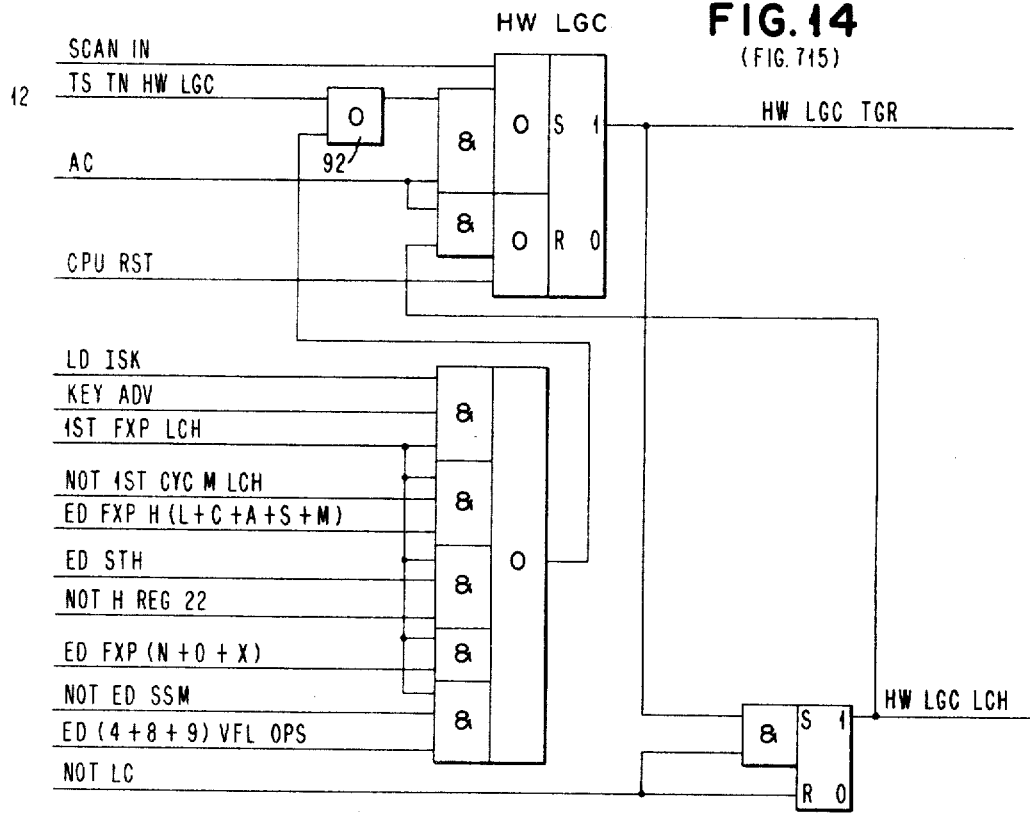
Figure 15:
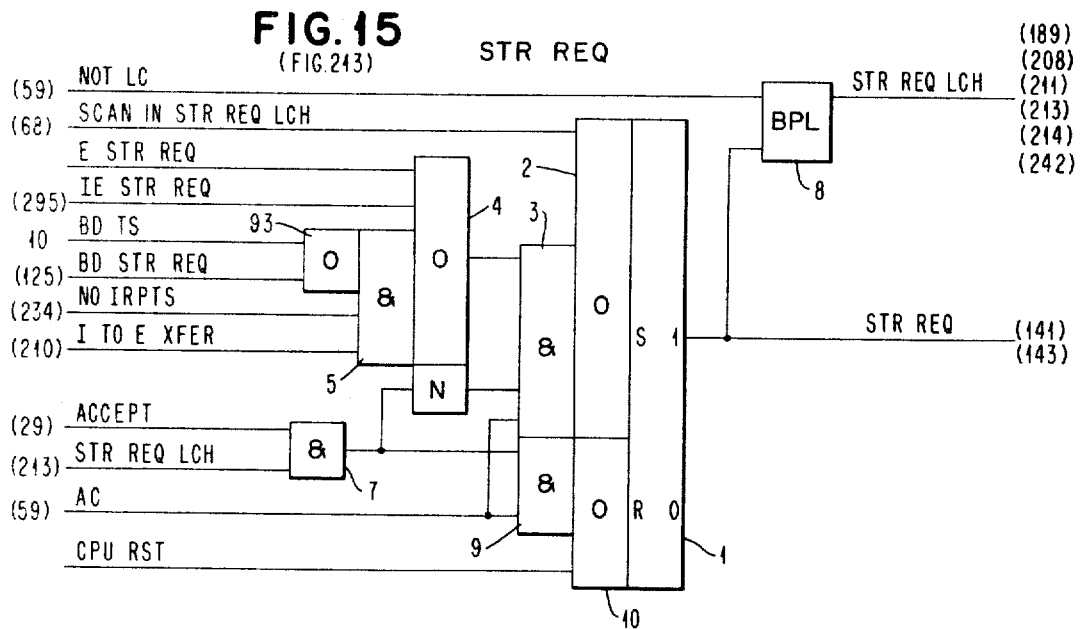

FIGS. 10–18 are illustrative of additions and modifications which may be made in a copending application of the same assignee entitled "Large Scale Data Processing System," filed on Apr. 5, 1965, by O. L. MacSorley et al., Ser. No. 445,326, now abandoned in favor of an application having the same title and inventors and having Ser. No. 609,238 filed Jan. 13, 1967, all hereinafter referred to as "said environmental system"; said FIGS. 10–18 are schematic block diagrams of the circuitry indicated in the following specific paragraphs:

FIG. 10—additions to the operand decoders;

FIG. 11—circuits modified by BD TS;

FIG. 12—circuits modified by ED TS;

FIG. 13—circuits modified by LD TS;

FIG. 14—the halfword logic trigger shown modified to be settable by the TS TN HW LGC line;

FIG. 15—the STORE REQUEST trigger shown modified to be settable by the BD TS line;

FIG. 16—the I STORE circuit shown modified to be operable by the STORE REQUEST latch only in the absence of a signal on the ED TS lines;

FIG. 17—circuits indicating how the MDR of FIG. 875 in said environmental system may have its output modified before being applied directly to the basic operational memory, in accordance with the principles illustrated in FIG. 3;

FIG. 18—circuits indicating how the MDR of FIG. 875 in said environmental system may have its output modified before being applied directly to the basic operational memory, in accordance with the principles illustrated in FIG. 2.

Although the present invention is disclosed in terms of control provided to storage locations in a main storage apparatus, such as a magnetic core storage device well-known in the art, the invention is obviously equally capable of being incorporated in conjunction with storage devices of other types, including transistor or similar dynamic registers.

Referring to FIG. 1, a typical storage device known to the art includes a memory address register 20 which controls selection, by addressing circuits 21, of a particular location in a basic operational memory 22 so as to control the reading and writing of data therefrom. Data to be stored in the memory is first applied to a memory data register 24, from which it is utilized to control inhibit drivers so as to selectively insert intelligible data in a corresponding plurality of bit positions within the actual core planes under control of inhibit drivers 26. When reading data from the storage device, the core planes 28 are driven in a ZERO direction so that the sense amplifiers 30 will provide data on a bus 32 to the memory data register 24. This data can then be read over a bus 34 to the utilization circuitry, and also may be applied over the bus 25 so as to regenerate the setting of the core planes in accordance with well-known storage techniques. FIG. 1 also illustrates that various checking, timing, and miscellaneous controls 36 are provided to govern the operation of the storage device.

FIG. 2 illustrates how the storage device disclosed in FIG. 1 may be modified so as to utilize the principles of the present invention in a case where storage is to be arranged to force a particular word or words to all ZERO's in response to an accessing thereof. For simplicity, a FORCE ALIKE signal is illustrated as being applied to an inverter 38 which is utilized to inhibit a plurality of AND gates 40 to prevent data from passing from the MDR to the BOM 22 whenever the forcing to a like condition, in accordance with the present invention, is to be utilized. The various ways in which the FORCE ALIKE signal may be generated are described hereinafter.

FIG. 3 is an alternative to the circuit shown in FIG. 2, which indicates that the particular storage word or words may be set to all ONE's in response to the FORCE ALIKE signal by ORing this signal with the various bits of the data stored in the MDR 24. This is achieved by providing a plurality of OR circuits 42 in the path between the MDR 24 and the BOM 22 so that, regardless of the data supplied on the regeneration bus 32, data will be supplied in each bit of the currently controlled word so that the BOM 22 will regenerate the word as all ONE's.

IN FIG. 4, a still further embodiment is shown to provide for no regeneration bus 32, whereby the main memory data register 24 is duplicated so as to provide an input memory data register 24a and an output memory data register 24b so that each accessing will be destructive, and all settings in the BOM 22 will result from new data supplied from the MDR IN 24a, whereas all data read from the BOM 22 will supplied only to the utilization circuits by means of the MDR OUT 24b.

In FIG. 5 is shown a modification to the inhibit drivers (or Z drivers) illustrated in a copending application of the same assignee entitled "Storage Drive Sense System," Ser. No. 445,306, filed on Apr. 5, 1965, by Anatole Furman. In setting data into a storage device contemplated by the Furman application, the word selection circuits tend to drive an entire word toward the ZERO direction, and the bit sensitive circuits, which respond to the main memory data register, inhibit the driving of selected bits toward ZERO so that these selected bits will remain set at ONE's. The operation of these inhibit drivers are selectively prevented by the provision of an AND circuit 44 which will block a timing signal utilized to gate a plurality of these driver circuits, the AND circuit 44 being prevented from operating by an inverter 46 which responds to a FORCE ALIKE signal.

Thus, the invention contemplates that a well-known storage device such as that illustrated in FIG. 1 may be modified as shown in FIGS. 2–5 so as to force ONE's or ZERO's by modifying the connections between the memory data register and the basic operational memory, by eliminating the regenerative loop, or by controlling the inhibit driver circuitry.

Various methods which might be utilized for controlling those conditions under which bits or words in storage should be forced alike in accordance with the present invention are described with respect to FIGS. 6–9 below.

Figure 6:
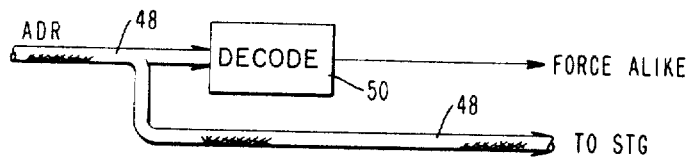
FIG. 6 is a simplified schematic block diagram of apparatus which generates a "FORCE ALIKE" signal in response to the decoding of a particular address, or group of addresses which are being applied to a storage apparatus.

In FIG. 6, address bits supplied on a bus 48 to control the accessing of a particular location in memory are also applied to a decoder 50, which recognizes one or more addresses, to generate a FORCE ALIKE signal for application to any of the circuits shown in FIGS. 2–5. The decode circuit could be any well-known decoder, such as a binary decoder which responds to certain bit configurations to recognize those addresses with which a FORCE ALIKE condition is to be associated.

Figure 7:
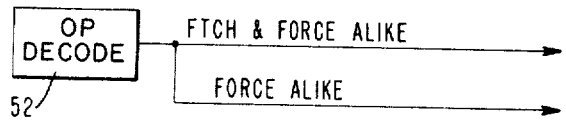
FIG. 7 is a simplified schematic block diagram illustrating that the "FORCE ALIKE" signal may be responsive to the operational control portion of an instruction.

In FIG. 7, the fact that a FORCE ALIKE condition can be recognized in response to a particular instruction is illustrated. Therein, a well-known operation decoder (OP DECODE 52) may recognize a particular instruction such as a "FETCH AND FORCE ALIKE" instruction, and thereby generate a FTCH & FORCE ALIKE signal;

this signal could also be used as a FORCE ALIKE signal for application to circuits of the type illustrated in FIGS. 2–5.

Figure 8:
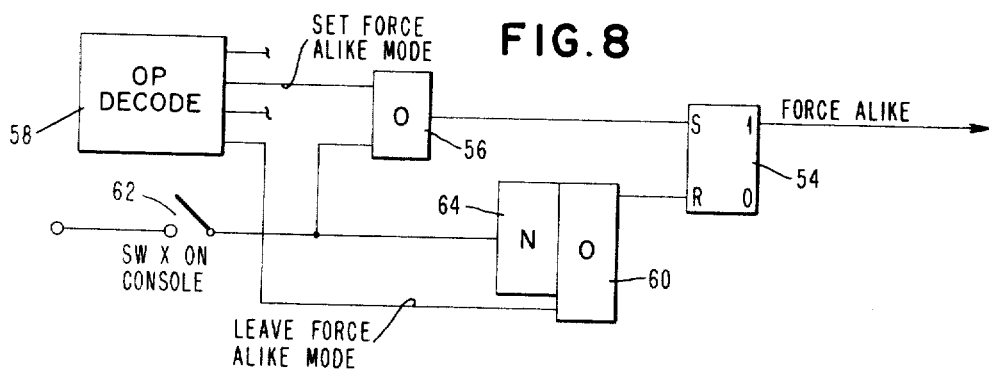
FIG. 8 is a simplified schematic block diagram indicating that "FORCE ALIKE" may be a stable condition settable in response to a particular instruction, and resettable in response to a further particular instruction, or controllable by a switch.

In FIG. 8, the provision of a FORCE ALIKE mode is illustrated to be settable in a latch 54 by an OR circuit 56 in response to an OP decoder 58 which generates a signal indicating a SET FORCE ALIKE MODE instruction which will cause the latch 54 to be set, so that it will, in turn, generate a FORCE ALIKE signal for application to circuits such as those illustrated in FIGS. 2–5. This means that all accesses to various storage locations (to which the signal is applied) will result in those locations being set alike (either all ONE's or all ZERO's) by circuitry illustrated in FIGS. 2–5 so long as the latch 54 was set. A second instruction such as a LEAVE FORCE ALIKE MODE instruction will cause an additional OR circuit 60 to reset the latch 54. Additionally illustrated in FIG. 8 is the fact that a switch on an operator's console may be utilized to put the system into the FORCE ALIKE MODE, due to the fact that the switch 62 is connected to the OR circuit 56 and is connected through an inverter 64 to the OR circuit 60. Thus, with the switch closed, the OR circuit 56 will cause the latch 54 to remain in the set condition, and when the switch is open, the inverter 64 will permit the OR circuit 60 to reset the latch 54.

Figure 9:
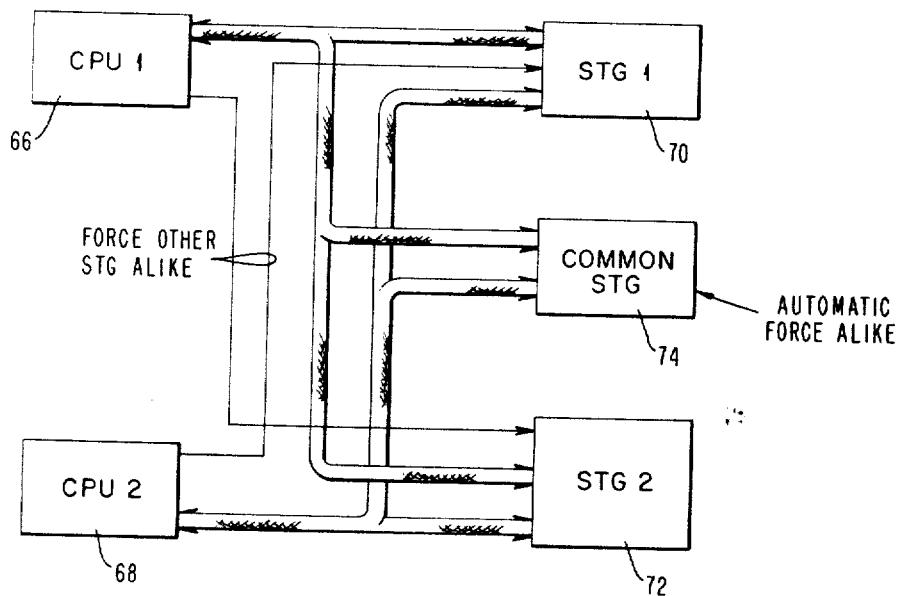
FIG. 9 is a simplified schematic block diagram illustrating that each CPU in a multiple CPU shared storage arrangement may force the accessed location of an opposite storage device so that all bits of the location are set alike, and a common storage device may be automatically set so that all bits of an accessed storage location are set alike.

A combined system in which various storage devices respond in different ways in accordance with the principles of the present invention, is illustrated in FIG. 9. In FIG. 9, two CPU's 66, 68 each have a corresponding preferred storage 70, 72, and are each connectable to a common storage 74. As shown in FIG. 9, each CPU (66, 68) can force the nonpreferred storage (72, 70 respectively) to an all-alike condition in accordance with the present invention, and also any fetches from a common storage 74 will automatically result in the location from which the fetch was made to be set all alike, as illustrated hereinbefore with respect to FIG. 4. Thus, a combination of operations may be provided in a system whereby selectable and automatic forcing may be utilized and where these might differ in dependence upon the particular system controlling the fetch.

Additional combinations may be made within the purview of the present invention, such as applying the FORCE ALIKE MODE of FIG. 8 to only locations selected as in FIG. 6.

Thus, FIGS. 6–8 illustrate different methods whereby FORCE ALIKE signals may be generated, FIG. 9 illustrates the combination of using FORCE ALIKE signals and automatic forcing, and FIG. 9 illustrates that a variety of force alike conditions may be provided within any system.

A most-specific embodiment of the present invention, which is illustrated in the environment of a system disclosed in a copending application of the same assignee entitled "Large Scale Data Processing System," filed on Apr. 5, 1965, by Olin L. MacSorley et al., is illustrated in the remaining figures. As contemplated in the environmental system of said copending application, hereinafter referred to as "said environmental system," a TEST AND SET instruction is provided, which instruction is defined as being in the SI format and has the mnemonic "TS"; the operation code is hexadecimal 93, which code is indicated in binary fashion at the inputs to the AND circuits of the OP decoder illustrated in FIG. 10 herein. The instruction has a single address including a base and displacement (B1, D1) which, when combined, indicate a storage location which is to be fetched and switched to all ONE's. The storage location involved is a single byte (eight data bits and a parity bit) of the storage word accessed by the instruction. A particular byte is determined by the three lowest-order address bits, and these bits are used to generate a MARK bit to identify the particular byte of the storage word which is involved in the TEST AND SET instruction. In executing the instruction, the byte specified by the MARK bit is fetched from storage, and the entire byte is automatically set to all ONE's in the storage device (such as storage 1AE, or or 1BO, in said environmental system). The definition of the instruction includes the fact that the byte in storage is set to all ONE's as it is fetched, and that no other access to the location is permitted between the moment of fetching and the moment of storing all ONE's. The condition code register, within the PSW register (as described in Section 9 of said copending application) is set in accordance with the condition of the highest-order bit of the selected byte as it is fetched: if the leftmost, or highest-order bit is a ZERO, the condition code is set to 00; if the leftmost bit is a ONE, the condition code is set to 01; no other condition code setting can result. If the specified storage word is within a protected area of storage with the wrong KEYS specified, a regular Protection interruption (as described in Sections 6 and 14 of said copending application) will result. If an improper address is specified, the normal Addressing type of Program interruption will result as described in said copending application.

From the foregoing definition, said environmental system responds to this instruction as follows. Additional operational decoders are provided as illustrated in FIG. 10 so as to decode the contents of the BOP, EOP, and LCOP registers with corresponding AND circuits 70–72 so as to generate related signals on the BD TS, ED TS, and LD TS lines. These lines are utilized throughout the system so as to control an execution which uses the VFL data flow and is performed as if it were a fixed-sequence VFL instruction. The first operand fetch is requested by using the E unit fetch request trigger. The word fetched from storage is returned to the J register, and when J is loaded, its contents are gated through the true/complement input of the main adder (MA T/C) to the L register (L REG). The first fixed-point trigger (1ST FXP TGR) is used to maintain the E unit in an execution state while waiting for the J register to be loaded with the whole, 64-bit storage word. When J is loaded, the first fixed point latch (1ST FXP LCH) is turned on, and this causes the contents of the J register to be moved to the L register.

Address bits 21–23 (found in the H register) control the gating of the L register into the VFL data flow, and control setting the MARK register so as to force all ONE's in the regeneration cycle of storage. The VFL sequencer trigger T5 is turned on and remains on for one cycle; this is used to gate H register bits 21–23 into the S and T pointer registers. The T5 trigger then turns on the T5 latch which gates the release of the S and T pointers so that the MARK bits can be set from the T latch and sent to the BCU for use in the storage unit. The S pointer is then used to select the correct byte of L at the RIGHT BYTE GATE (RBG) of the VFL data flow, the highest-order bit of which, bit 0, is used to set bit 35 of the PSW register, which is the low-order bit of the condition code. Then E last cycle (ELC) is turned on and is utilized to actually set the condition register and to terminate the instruction. During the regeneration cycle of the fetch performed in storage, the contents of the selected byte, as defined by the MARK bits, is altered.

It is possible that the same storage location might have been specified as the source of an instruction, and therefore might have been prefetched into the A or B instruction register. If this were so, then the actual contents of the prefetched word, now stored in the A/B buffer register, would be erroneous. To determine when this condition might occur, a program store compare (PSC) operation is therefore needed as for all other store instructions, even though this instruction is in reality a fetch with an automatic forcing during the regeneration cycle. Therefore, the store request latch (STR REQ LCH) is turned on whenever the TEST AND SET instruction is being performed, just as it is for all CPU store (STR)

operations; this latch initiates the comparison which would indicate that data, which is now being changed, has already been fetched in a prefetch operation to the CPU, so that the storage word can be again fetched, after it is changed, in a recovery operation (RCVY ONLY). The store request signal generated by the latch is *not* forwarded to the bus control unit for controlling storage whenever it is set by the TEST AND SET instruction; it is blocked from going to storage, and is therefore utilized only to control the program store compare operation in the CPU. Similar store-type functions are required in the bus control unit since the selected byte is set to all ONE's. For instance, it would be erroneous to permit setting this byte to all ONE's in a protected area of storage for which suitable protection keys were not provided; in other words, if the data should *not* be changed by the current program, then the forcing to all ONE's should not be permitted. Similarly, the MARK REGISTER must be reset and loaded so as to reflect the correct mark bit for the operation just as is in the case of a store operation. These functions are taken care of specially, in the bus control unit, in a manner similar to the usage of the store request, in the I unit, which causes program store compare as described hereinbefore.

In FIGS. 10–18, reference in parentheses are to said copending application.

Certain of the functions required for the TEST AND SET operation are accounted for in said environmental system due to the particular nature of the decoding; certain events are caused by instruction grouping lines, the grouping for which is sufficiently broad to include the TEST AND SET instruction; other functions are performed by utilizing the TEST AND SET decode lines which are generated in FIG. 10 herein to cause circuits to respond not only in the previously provided fashion (as disclosed in said copending application) but additionally in response to TEST AND SET, as disclosed herein only. The circuits of FIGS. 11, 12 and 13 indicate that functions previously performed by certain instructions must now also be performed by the TEST AND SET instruction, and these figures have been developed in such a fashion as to take the condition previously provided for in the system, and to OR with it functions provided herein, by means of the circuitry shown in FIGS. 11–13 being inserted between the original function and its original utilization devices. As an example, consider an OR circuit 74 in FIG. 11: this responds to a signal on a CPU STR line which is generated in FIG. 38 of said copending application to provide a signal on a CPU STR line which is supplied to FIG. 40; in said environmental system, without the modifications shown herein, the CPU STR line is applied directly from FIG. 38 to FIG. 40. Thus, the OR circuit 74 provides an *additional* way in which a signal may be generated at the input to FIG. 40 on the CPU STR line. This additional way is embodied in an AND circuit 76 which responds to the setting of the store request latch due to a signal on a STR REQ LCH line concurrently with a TEST AND SET output from the BOP DECODE as indicated by a signal on the BD TS line. Therefore, when the STR REQ LCH latch is turned on so as to cause the program store compare, it is ANDed with the TEST AND SET indication from the BOP DECODE so as to cause a resetting of the MARK register by forcing the CPU STORE line to have a signal at the input of FIG. 40, even though the CPU STORE line coming out of FIG. 38 has no signal thereon.

An AND circuit 78 in FIG. 11 illustrates a different type of modification which is to provide the *new* function of forcing bits alike in storage when the fetch is made in response to the TEST AND SET instruction. This is achieved by the AND circuit 78 generating a signal on the TS SET ALIKE line in response to signals on the BD TS, E FTCH REQ, and CPU COM lines. These lines indicate that a fetch is being made at the request of the E unit and that the fetch is recognized in the bus control unit as being a CPU fetch.

Additional modifications of the type described with respect to the OR circuit 74 in FIG. 11 are made in the circuits of FIG. 12, which modifications are all responsive to a TEST AND SET signal from the EOP decoder on the ED TS line. A first pair of OR circuits 80, 81 respond to identical AND circuits 82, 83 so as to force the turn-on of the E FETCH REQUEST trigger and the turn-on of the latch which controls setting the address adder output into the storage address register and the H register. The AND circuits 82, 83 recognize the TEST AND SET instruction with the first fixed-point trigger on, and the T5 trigger on. The T5 trigger is itself turned on in said environmental system (FIG. 459, sheet 320) due to an AND circuit which responds to E GO, E END, FIRST E CYC, and ED (4*+8*+9*) VFL OPS. This line includes all instructions with a code which is hexadecimal 90 through 99 and therefore includes TEST AND SET which has a code of hexadecimal 93. Similarly, an OR circuit 84 causes mark parity and the marks to be set during a TEST AND SET instruction when the T5 latch is on due to an AND circuit 86. Also, an OR circuit 87 causes the E unit turn-off of the ICM block to be removed during TEST AND SET when the fetch request is accepted as indicated by the signal on the ACC TGR line when the 1ST FXP LCH is on in response to an AND circuit 88. One special signal on the TS TON HW LGC line is generated by an AND circuit 90 in response to signals on the ED TS, 1ST FXP LCH and NOT ED SS lines. This signal is utilized in FIG. 14 herein as a way in which the halfword logic (HW LGC) latch can be turned on for the TS instruction in response to an OR circuit 92. The remainder of the circuit shown in FIG. 14 is identical to that shown in FIG. 715 of said environmental system. The remainder of FIG. 12, and the circuits of FIG. 13 are each of the type described with respect to the circuits 80–88 in FIG. 12 in that they provide additional ways in which the various lines may be generated in response to the TEST AND SET instruction, all of which is obvious to those skilled in the art.

The store request latch (STR REQ) shown in FIG. 15 is identical to that shown in FIG. 213 of said environmental system with the exception of the fact that the AND circuit 5 has an additional input thereto from an OR circuit 93 responsive to BD TS from FIG. 10 herein. Thus, whenever the BOP decode indicates a TEST AND SET instruction, the STR REQ trigger and then the STR REQ latch will be turned on so as to provide for the program store compare function described hereinbefore. The output of the STR REQ latch is prevented from causing a storage operation of the store type by the circuits shown in FIG. 16, which is identical to the circuitry of FIG. 214 in said environmental system with the exception of an AND circuit 94 which is included in the present embodiment so as to prevent the store request latch from causing a signal on the I STR line (thereby causing a store-type operation in the bus control unit) whenever the TEST AND SET instruction is decoded. In other words, the AND circuit 94 will permit a store request (I STR) to be sent to the BCU only when there is other than a TEST AND SET instruction.

The circuits of FIGS. 17 and 18 illustrate how the concepts described with respect to FIGS. 3 and 2, respectively, may be implemented in the storage apparatus illustrated in said environmental system. Thus, if the output of the memory data register (FIG. 875 in said environmental system) will not pass directly to the basic operational memory inhibit drivers, but are passed through a circuit of the type illustrated in FIG. 17, or of the type illustrated in FIG. 18, then the selected byte could be forced to all ONE's or all ZERO's in respective dependence upon which of the circuits are used, in accordance with the present invention.

In FIG. 17, a plurality of AND circuits 100 are provided, one for each of the eight mark bits, and therefore one for each of the bytes within a storage word. Whenever the particular mark bit is selected, and the signal appears on the TS SET ALIKE line, then a plurality of related OR circuits 102 will force the data bits within that byte to ONE's as a result of the output of the related AND circuit 100. The setting of all ONE's is in accordance with the TS instruction as disclosed herein. The TS instruction would be equally served by apparatus according to the embodiment of FIG. 5. In a similar fashion, an alternative circuit of FIG. 18 includes a plurality of AND circuits 106 each of which feeds an inverter 107, the output of each inverter corresponding to a particular byte specified by the mark bit input to the related AND circuit 106. Whenever the TS SET ALIKE signal appears, the particular AND circuit which relates to a mark bit from the mark register (FIG. 40 of said copending application) will cause the bits of the related byte all to be ZERO's due to the inhibiting effect of the inverter 107 on a related group of AND circuits 108. This setting to ZERO's is exemplary only, and not used in the TS embodiment herein. Thus, the set-alike signals may be used as in FIG. 17 to force the bits to ONE's, or to block the bits, so that they are forced to ZERO's as shown in FIG. 18, as a matter of choice.

Functions that are required by the TEST AND SET instruction, for which provision is already made in said environmental system are set forth in the chart which follows. In the chart, the figure number (and sheet wherein the figure is found) are set forth with the functional control line which is required, together with an explanation of the method by which TS can cause the line to operate: typically, TS has a code of 93 which is included in all 9* (90–99) decode lines, and also is included in VFL FXP operations.

| In copending application | | Line name | TS included in— |
|---|---|---|---|
| Fig. | Sheet | | |
| 710 | 512 | TON 1ST FXP TGR | NOT ED SS NOT (EOP 2 & WDD+RDD) OR 1ST FXP TGR |
| 710 | 512 | GT 1ST FXP OR FLP LCH | J LOADED |
| 459 | 320 | TON TS TGR | ED (. . . . 9*) VFL OPS |
| 459 | 320 | TOF T5 TGR | ED (. . . . 9*) VFL OPS |
| 767 | 489 | E SET CR | LD RS SI SET CR |
| 487 | 343 | H 21-23 TO S LCH | ED (. . . +9*) VFL OPS |
| 487 | 343 | H 21-23 TO T LCH | ED (. . . +9*) VFL OPS |
| 489 | 345 | REL S & T PTRS | ED (. . . +9*) VFL OPS |

It should be understood that the TEST AND SET instruction as implemented in said environmental system is but one embodiment of the invention, and is illustrated herein as a detailed hardware environment of one application of the present invention only.

As illustrated with respect to FIGS. 1–9, the invention contemplates forcing an entire register or a portion thereof to all ONE's or to all ZERO's in response to address control, the particular storage device being accessed, the particular current instruction, or a mode settable by switches or by instructions. These are exemplary only, and are not to be limiting by way of specification.

In the embodiment of the invention relating to the TEST AND SET instruction adaptation to said environmental system, the setting of the selected byte to all ONE's necessarily provides a ONE in the highest-order (or leftmost) bit of the byte. Since the setting of this byte is used to set the condition code, any reference to this byte following a TEST AND SET instruction, before the time when some sort of a store instruction would cause the setting of this byte to be restored to all ZERO's (or to some other bit combination), would indicate to either a different part of the program, to a different program being run in the same system, or perhaps to a different system which is accessing the storage device on a shared basis, that the byte had previously been accessed under a TEST AND SET instruction. No mention has been made of the utilization of the setting of the condition register in response to the highest-order bit of the byte, and it should be obvious that the setting of the condition register may be used for anything permitted by the instruction set of the system. For instance, a BRANCH-ON-CONDITION instruction may follow the TEST AND SET instruction, and if the branch is successful, certain functions can be performed. The specification of the condition, upon which branching is to be effected, could be adjusted so as to permit branching if the highest-order bit were a ONE, or to prevent it if the highest-order bit were a ONE. Thus, complete flexibility and control is provided by the TEST AND SET instruction. This is an example of the reference hereinbefore to the fact that the subject invention might be utilized to prevent accessing a storage word itself once it has been read, or it might be used more indirectly as a control over any sort of a function in a system.

Minor modifications to the TEST AND SET instruction might be made by those skilled in the art to provide still further capability to a data processing system in accordance with the present invention. For instance, a LOAD, TEST AND SET instruction might be provided which would not only test the highest-order bit and set a condition register, or similar device, but would also load the tested byte of data into an accessible register within the CPU so that the data itself might be used for an additional purpose. This would provide still further flexibility and would permit such operations as setting the selected byte to 10000 immediately after the TEST AND SET instruction, and then later looking at the status of the byte so that an indication of all ZERO's would mean a still further accessing had taken place after the accessing relating to the particular function under control. Thus, if two systems were sharing a particular storage apparatus, one system could use the TEST AND SET instruction to force the bits to all ONE's thus indicating that it is using the particular storage apparatus, and follow this with a store instruction to set that particular byte to a high-order ONE with the remaining bits set to ZERO. Then, if a second system accessed the same byte, it would set the byte to all ONE's and having tested the highest-order bit, determine that it could not now have access to the device; it would not therefore do anything further with the byte since the highest-order bit was set to a ONE. The first system might then, however, periodically check to see if the second system had attempted to make an access, so that the first system would then know that some other system was waiting to make a reference to that storage device and might therefore branch to some other operation so as to permit the second system to have a chance at the storage device. The foregoing is merely illustrative of variations which might be performed, the variations being limitless once a particular modus operandi is established.

The examples described with respect to FIGS. 1–9 relate to how a storage device might be controlled, and how the indication that it is to be controlled might be generated in accordance with the present invention. It is obvious that if a particular storage word is automatically left in an all ONE's or all ZERO's state, once it has been referenced, the data content of the register is not available on a subsequent reference. This is illustrative of the reference hereinbefore to the fact that the data content of the register might itself be directly made unavailable merely as a result of accessing the register or a location in a storage device. Although FIG. 17 and FIG. 18 illustrate the SET ALIKE philosophy, a combination of the two effects can be realized to afford a SET PRESCRIBED for any desirable aggregation pattern. Thus, some bytes could be forced to ONE's and some bytes forced to ZERO's. Alternatively, the arrangements illustrated in FIGS. 17 and 18 could be combined on a bit-by-bit basis so as to force a pattern into a storage word, or alternative, controlled patterns could be used.

The important point is that the single operation on the storage device provide (1) interrogation and (2) modification of the contents to an acceptable representation (3) in time to prevent ambiguous interpretation by alternate accessing vehicles; the invention is not dependent on, or limited to, ALIKE per se.

The invention provides the interlock capability, under either address or operation code control, which is required by a multiple-accessing environment. In addition, the invention provides a much faster means of interrogating, and setting the contents of, a control area of storage. Although speed is not always important, it becomes nearly mandatory in an interlocked, independent multiple-accessing environment. Interlocking by means of apparatus in accordance with the present invention would remain effective until the accessing device, or other controlling entity, utilized conventional means to restore the field to its nominal state. Improved and faster performance of any system in such an environment is realized through the invention.

Although this invention has been shown and described with respect to particular embodiments thereof, it will be obvious to those skilled in the art that the foregoing and other changes and omissions in the form and detail of the present invention may be made therein without departing from the spirit and scope of the invention, which is to be limited only as set forth in the following claims.

What is claimed is:

1. In a data processing system including a storage, a storage access control, comprising:
   a registering apparatus having binary register locations capable of storing data manifestations in the form of different bit configurations representing corresponding different values;
   means for accessing said register locations so as to derive data manifestations therefrom;
   and forcing means operative, directly as a result of an access by said means for accessing and independently from the contents of said register locations, to set a preestablished bit configuration in said register locations, said preestablished bit configuration identifying the accessibility of said storage.

2. The device described in claim 1 wherein all of the bits in said preestablished bit configuration are of the same value.

3. The device described in claim 1 wherein said forcing means for the setting of said preestablished bit configuration operates so as to provide said setting prior to the possibility of any further accessing of said register locations.

4. The device described in claim 2 wherein said bits are set to all ONE's.

5. The device described in claim 2 wherein said bits are set to all ZERO's.

6. The device described in claim 1 wherein said forcing means includes means for selectively modifying the output of the memory data register.

7. The device described in claim 1 wherein said forcing means includes means for selectively blocking the operation of inhibit drivers.

8. In a data processing system including a storage, a storage access control comprising:
   a registering apparatus having register locations capable of storing data manifestations in the form of different bit configurations representing corresponding different values;
   means for accessing said register locations so as to derive data manifestations therefrom;
   forcing means operative to set a preestablished bit configuration in said register locations, said preestablished bit configuration identifying the accessibility of said storage;
   and means to test the data significance of the data manifestations derived from said register locations.

9. The device described in claim 8 wherein only a portion of the data manifestations of said register locations is tested for control significance.

10. In a data processing system including a plurality of storage units and a plurality of processing units, an apparatus for controlling processing unit access to the storage units comprising:
    a plurality of registers where each storage unit is associated with a different one of said registers and where each register includes register locations capable of storing different data manifestations in the form of different bit configurations;
    accessing means, controlled by each processing unit, for accessing any of said registers so as to derive accessed data manifestations from an accessed register;
    forcing means operative, directly as a result of an access by said accessing means and independently from the contents of said accessed register, to set a preestablished bit configuration in said accessed register which identifies an accessibility condition of a storage unit associated with said accessed register;
    and means controlled by each processing unit to test said accessed data manifestations so as to determine the accessibility of the storage unit associated with said accessed register.

11. The data processing system of claim 10 further including resetting means for resetting said accessed register with a bit configuration which identifies another accessibility condition of the storage unit associated with said accessed register.

12. The data processing system of claim 11 wherein said resetting means includes a manual switch.

13. In a data processing system including a storage unit and a processing unit, an apparatus for controlling processing unit access to the storage unit comprising:
    a plurality of registers where portions of each storage unit are associated with a different one of said registers and where each register includes register locations capable of storing different data manifestations in the form of different bit configurations;
    accessing means, controlled by a processing unit, for accessing any of said registers so as to derive accessed data manifestations from an accessed register;
    forcing means operative, directly as a result of an access by said accessing means and independently from the contents of said accessed register, to set a preestablished bit configuration in said accessed register which identifies an accessibility condition of a storage unit portion associated with said accessed register;
    and means controlled by each processing unit to test said accessed data manifestations so as to determine the accessibility of the storage unit portion associated with said accessed register.

References Cited

UNITED STATES PATENTS

| | | | |
|---|---|---|---|
| 3,328,765 | 6/1967 | Amdahl et al. | 340—172.5 |
| 3,264,615 | 8/1966 | Case et al. | 340—172.5 |
| 3,158,844 | 11/1964 | Bowdle | 340—174.1 |
| 3,108,257 | 10/1963 | Buchholz | 340—172.5 |

OTHER REFERENCES

IBM Technical Disclosure Bulletin, vol. 4, No. 10, March 1962, by R. R. Seeber Jr., and F. B. Hartman, "Tag-Addressed Memory," pp. 73–75.

PAUL J. HENON, *Primary Examiner.*

GARETH D. SHAW, *Assistant Examiner.*

Notice of Adverse Decisions in Interferences

In Interference No. 97,295 involving Patent No. 3,405,394, J. F. Dirac, CONTROLLED REGISTER ACCESSING, final judgment adverse to the patentee was rendered Nov. 7, 1972, as to claims 1, 2, 3, 4, 5, 6, 8, 9, 10, 11 and 13.

[*Official Gazette May 8, 1973.*]